United States Patent
Berning et al.

(10) Patent No.: US 6,379,493 B1
(45) Date of Patent: Apr. 30, 2002

(54) DEVICE FOR TRANSPORTING AND DEPOSITING MATERIAL STRIPS

(75) Inventors: Klaus Berning, Burgwedel; Lutz Wedemeyer, Wunstorf, both of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/453,173

(22) Filed: Dec. 2, 1999

(30) Foreign Application Priority Data

Dec. 9, 1998 (DE) .......................................... 198 56 720

(51) Int. Cl.$^7$ .............................................. B29D 30/30
(52) U.S. Cl. ...................... 156/405.1; 156/398; 156/422
(58) Field of Search ................................ 156/397, 398, 156/405.1, 406.4, 406.6, 422; 271/18.3, 141; 269/54.1, 54.4

(56) References Cited

U.S. PATENT DOCUMENTS 3,944,457 A * 3/1976 Podvin et al. ............ 156/405.1
5,935,377 A * 8/1999 Sergel et al. ............. 156/406.4

FOREIGN PATENT DOCUMENTS

| DE | 1904481 | 8/1970 |
|---|---|---|
| EP | 0623451 | 11/1994 |
| JP | 57-105336 | 6/1992 |

\* cited by examiner

Primary Examiner—Geoffrey L. Knable
(74) Attorney, Agent, or Firm—Smith, Gambrell & Russell, LLP

(57) ABSTRACT

Device for transporting material strips made of rubber or a rubber-like synthetic material and for depositing such material strips on an installation drum for pneumatic tires or its parts, in particular, for depositing narrow apex strips on a bellows drum, wherein the advancing material strips are cut to length from an endless material and positioned on a pattern table within the region of the device. The device contains pivotable receptacle devices that can be displaced in the transport direction and that are used to take hold of at least one end of the material strips positioned on the pattern table in order to transport the material strips to the depositing position and to deposit said material strips on the installation drum, wherein the receptacle devices can be displaced in a transport direction that is essentially tangential to the surface or circumference of the installation drum, and wherein said receptacle devices contain one or more holding elements that penetrate into the material strips and produce a temporary and detachable positive connection with the material strip.

9 Claims, 4 Drawing Sheets

DEVICE FOR TRANSPORTING AND DEPOSITING MATERIAL STRIPS

INTRODUCTION AND BACKGROUND

The present invention pertains to a device for transporting material strips made of rubber or a rubber-like synthetic material and for depositing such material strips on an installation drum for pneumatic tires or its parts, in particular, for depositing narrow apex strips on a bellows drum, wherein the advancing material strips are cut to length from an endless material and are positioned on a pattern table within the region of the device. The device contains pivotable receptacle devices that can be displaced in the transport direction and that are used to take hold of at least one end of the material strips positioned on the pattern table in order to transport the material strips to the depositing position and to deposit said material strips on the installation drum.

When manufacturing a new tire, the internal ply of a tire is deposited first on a tire installation drum, and then a carcass layer is deposited on the inner ply. The bead cores, including the apex, are then attached while the installation drum is expanded. The bead core and the apex form a pre-fabricated unit that is manufactured on a separate drum (bellows drum) and laterally pushed and positioned on the layers already located on the tire installation drum in the form of pre-fabricated rings. During the pre-fabrication, the apex profiles/bead filler profiles, which have the shape of material strips, are fixed to the bellows drum with one end either manually or with the aid of small vacuum suction cups and then rolled thereon.

The next process taking place on the tire installation drum is the high-impact process, in which the carcass layer ends are folded around the bead cores. This process is carried out with the aid of bellows. Subsequently, another carcass layer—if such a second layer is provided—as well as the side strips (side wall parts) and the horn profiles are attached. The tire carcass is now finished and can be removed from the installation drum, which is returned to its original position.

The additional installation begins with the transfer of the tire carcass to a second installation machine with another installation drum that contains a cambering part. The belt layers that usually consist of two or three rubberized steel cord layers are deposited on a separate belt drum and, if required, provided with one or two layers of a nylon bandage. Belt buffer strips may be arranged between the individual belt layers. If required, the cover strip is provided with a lower plate that is finally deposited on this belt packet. A transfer device that contains a carrying ring for the belt/cover strip packet transports the belt/cover strip packet to the tire carcass and positions it over said carcass. The tire carcass which is already centered and pre-cambered is now completely cambered and joined with the belt/cover strip packet, with the cover strip including the belt packet being rolled on after removing the transfer device.

The described method is a so-called two-stage installation. However, conventional one-stage methods are also used. In this case, the manufacturing of the carcass and the finishing of the base tire takes place within a single tire assembly system with several assigned drums.

The finished base tire is vulcanized in a corresponding vulcanization mold that provides the tire with its final shape, with an integrated cover strip profile and side walls that contain lettering or decorative designs.

Known manufacturing methods are composed of individual steps with precisely defined production sequences, all of which contribute to determining the quality and the properties of the finished product. Among other things, special care is required during the manufacturing of the apex or core filler profiles that are processed further in the form of a unit together with the bead cores and that usually have the shape of material strips with a more or less triangular cross section. The material strips are deposited on the bellows drum with one of the longer sides of the triangle, rolled on and connected to one another within the end regions.

The depositing of the apex profiles is associated with certain difficulties due to the fact that the profile strips, which essentially have a triangular cross section, are extremely sensitive to mechanical stresses, cuts, expansions and bending. In addition, different stability properties and elasticities of the material caused by the geometry exist in the plastic state due to the cross section that is tapered over the width of the strip, and it is extremely difficult to deposit the edges in an exactly linear fashion without waves and bends.

The handling of such apex strips also becomes more difficult due to the fact that the surfaces of such profiles, which are beveled on one side, make it very difficult to adapt the holding and transport elements, e.g., suction cups. Consequently, a manual deposition or a manual correction is required in many instances.

In addition to the macrogeometric design in the form of a bevel, texture characteristics of the surface frequently are the source of problems in handling the strips. If certain time periods between the emergence from the extruder and the deposition on the drum are exceeded or, for example, recycling material is incorporated into such strips, an uneven surface with many small waves, ripples or elevations will often be formed. This means that vacuum suction cups can no longer be used and a manual deposition needs to be carried out.

Another problem in handling apex strips is caused by the trend to use narrow apex profiles, e.g., apex profiles required for low-profile tires or special constructions. Generally, apex strips, in which the long sides of the triangle have a width of approximately 60 mm, have been used up until now. Today, apex strips, in which the corresponding width is merely 10–15 mm, are frequently manufactured.

The handling of such narrow apex strips is also limited with respect to miniaturizing the holding elements for automatic deposition devices. For example, the application limit with respect to the conventionally used suction cups is already reached at an apex strip width of 15 mm, and a secure retention and handling can no longer be ensured. Consequently, one is forced to resort to a manual deposition method that interrupts with and disadvantageously influences the entire manufacturing process.

U.S. Pat. No. 3,904,471 (Kubinsky et al.) shows a tire installation device for depositing a narrow material strip which consists of a depositing wheel that is equipped with needles on its outer side and that engages or is in tangential rolling contact with the tire installation drum. The tire installation drum and the needle wheel are pressed against one another under pressure and roll on one another such that the narrow strip to be deposited is pressed onto the tire installation drum. After one complete circumferential revolution, the strip is cut to length with a hot knife in the vicinity of the needle wheel and the resulting part is then pressed onto the drum.

The disadvantages of this device are the high pressure, with which the needle wheel is pressed against the tire installation drum that is provided with a flexible casing for expansion purposes, and the resulting extreme wear of the drum surface. In addition, it is difficult to realize the movement of the needle wheel relative to the movement of the installation drum while these two components roll in contact with one another and while pulling the needles out of the deposited material. The resulting direction of movement of a needle tip after it passes the contact point between the drum and the needle wheel is oriented tangential to the outer circumference of the needle wheel, and the deposited material follows the contour of the installation drum. Consequently, a "tear-off movement" results due to the radial component of movement of the needle tip. This results in the adhesion of the material strip on the installation drum caused by the partial elimination of the contact pressure, and also relatively long tear-out traces that remain in the material.

If material strips are intended to be deposited with reinforcing elements by means of such a device, a few of the reinforcing elements may be pulled out while the drum and the wheel roll in contact with one another.

It is therefore an object of the invention to provide a transport and deposition device for depositing material strips made of rubber or a rubber-like synthetic material on an installation drum. More particularly, it is an object of the present invention to be able to deposit narrow apex strips of any geometric configuration and an arbitrarily designed surface automatically and without any handling problems. A further object of the present invention is that the device should have a simple and practical design and should be easily incorporated into existing manufacturing systems.

SUMMARY OF THE INVENTION

The above and other objects of the present invention can be achieved by a device as described below. The device of the present invention is for transporting material strips made of rubber or a rubber-like synthetic material and for depositing such material strips on an installation drum for pneumatic tires or its parts, and in particular, for depositing narrow apex strips on a bellows drum. There, the advancing material strips are cut the length from an endless material and positioned on a pattern table within the region of the device. A feature of the device of the invention is the presence of pivotable receptacle devices that can be displaced in the transport direction and which can be displaced in the transport direction and which can take hold of at least one end of the material strips positioned on the pattern table in order to transport the material strips to the depositing position and to deposit these material strips on the installation drum. The receptacle devices can be displaced in a transport direction that is essentially tangential to the surface or circumference of the installation drum and the receptacle devices contain one or more holding elements that penetrate into the material strip and produce a temporary and detachable positive connection with the material strip.

Due to this design of the device, a precise retention and fixing of the material strips to be deposited is achieved that does not depend on the surface structure or the profile geometry. In addition, the essentially tangential transport direction, which makes it possible to transfer the material without sudden changes in the drum movement, provides a continuous and interference-free deposition on the installation drum or on the bellows drum without damage to the material.

BRIEF DESCRIPTION OF THE DRAWINGS

The present invention will be further understood with reference to the accompanying drawings, wherein.

DETAILED DESCRIPTION OF THE INVENTION

Figure 1:
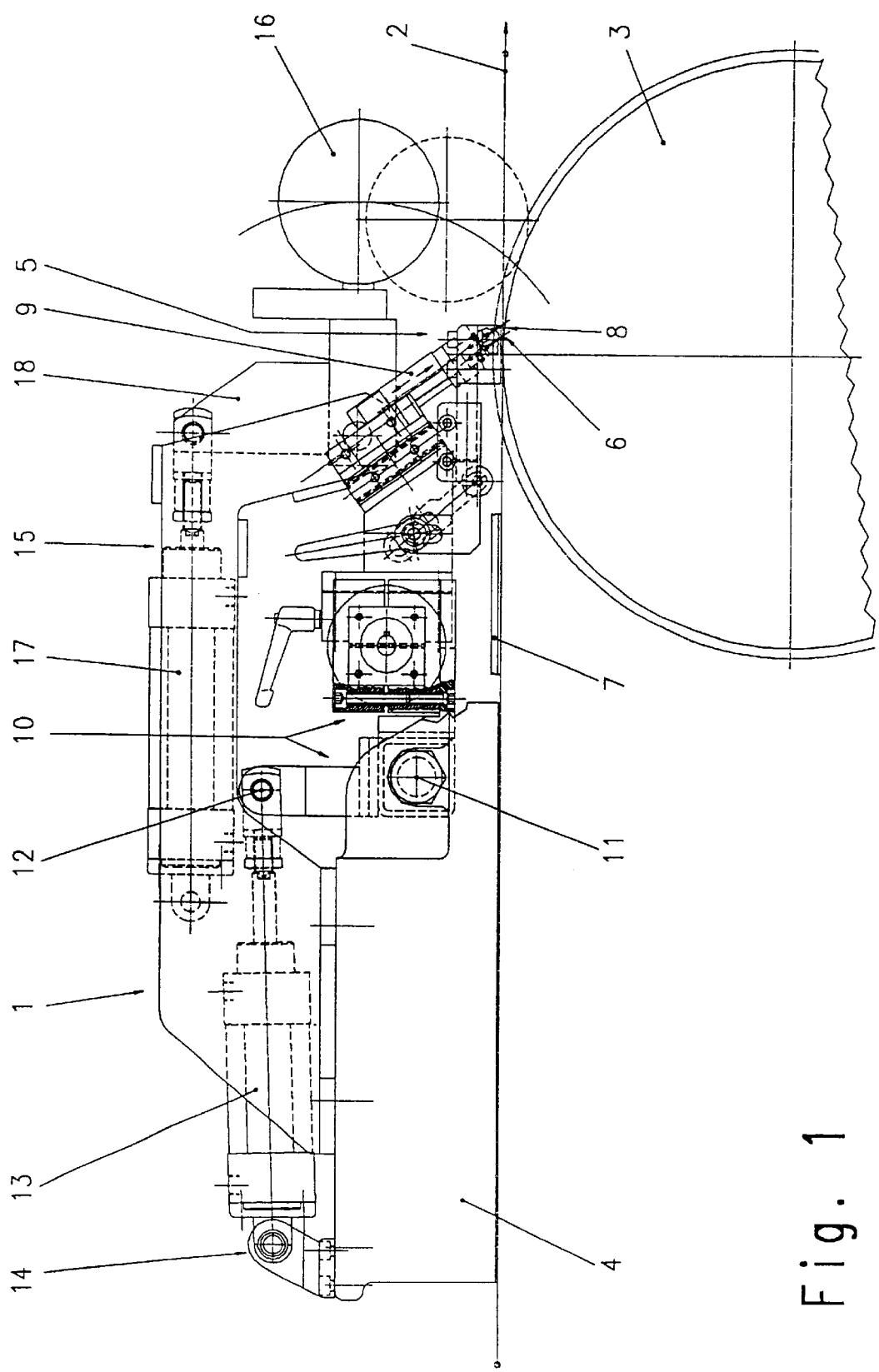
FIG. 1 is a schematic side view of a device according to the invention.

One particularly advantageous embodiment of the device consists of realizing the holding elements in the form of one or more needles that penetrate into the material strips and are arranged so that they are inclined toward the rear relative to the transport direction of the material strip. In this case, the receptacle device for pushing in the needles is designed such that it can be displaced parallel to the needle axes.

Due to the design of the holding elements in the form of needles that penetrate into the material strip, the influence on the material strip is limited locally to a minimum. Consequently, it is possible to deposit material strips of nearly any width, e.g., apex strips with a width between 10–15 mm. In addition, the damage to the material strip caused by the penetration of elements that produce a positive connection is so minute that the damage can be entirely reversed during subsequent processing, e.g., rolling during the installation process, and the damaging influence of the small holes caused by the penetrating needles can no longer be detected in the material strip.

In addition, holding elements designed in this fashion make it possible to transport and deposit material strips with arbitrary cross-sectional shapes because tapered or beveled regions in the vicinity of thicker zones of the material strip can also be easily fixed by means of penetration through essentially the entire thickness of the material strip.

If several needles are arranged over the width of the strip and a few needles penetrate into thicker regions and a few needles penetrate into thinner regions, the cross sections of the strip can support one another and a uniform and adapted holding, guiding and transport force results due to the division into many small adjacent force transfer regions.

The incline of the needles toward the rear relative to the transport direction of the material strips generates a force component that acts in the transport direction and a force component that acts perpendicular to the transport direction during transport and deposition of the material strips. The force components allow a reliable fixing of the material strip and effectively prevent the material strip from slipping off during the transport or deposition process. The ability to additionally displace the receptacle device parallel to the needle axes is essential for minimizing the regions influenced by the penetration of the needles. In contrast to needles or holding elements that penetrate into the material strip on a circular or oblique path, puncture traces or furrows caused by the penetration or retraction of the needles are prevented so that the influenced surface of the material strip is actually limited to the respective needle cross section.

Another advantageous embodiment of the invention consists in arranging the needles that penetrate into the material strip in the form of at least two rows of needles that lie one behind the other, with each row containing four needles that lie adjacent to one another and are uniformly distributed over the width of the material strip. Due to this uniformity and distribution of the force introduced into the material strip, one not only achieves an exceptionally reliable guidance and retention of said material strip, but the down times are also reduced due to the existing redundancy of holding elements. In addition, maintenance procedures do not have to be carried out as frequently because it has been determined that the transport and deposition function is sufficiently performed even if individual needles fall out. Consequently, the replacement of needles can be carried out during planned down times of the machine.

Another advantageous embodiment is attained due to the fact that the tips of the needles that penetrate into the material strip are in the form of a cylinder section (ungula of a cylinder), wherein the cylinder section surfaces are arranged such that they are inclined essentially perpendicular to the transport direction and toward the rear relative to the transport direction.

Needles realized in this fashion, in conjunction with the inclined orientation of the needles toward the rear, provide an essentially elliptical surface for transferring the feeding force or transport force. Consequently, tearing out of the needles or an excessive expansion of the material during the transport to the deposition point are prevented due to the reduced surface pressure. In addition, the processing of the needle tips is simplified because this needle design only requires a chamfering or beveling of the needle tips. The beveling of the needles with round cross sections takes place at an angle of approximately 20–35° relative to the needle axis.

Another advantageous embodiment consists of arranging the needles that penetrate into the material strips such that they are inclined toward the rear relative to the transport direction of the material strip at an angle not greater than 55°. Due to this limit on the incline, a sufficiently reliable generation of force components in the transport direction and perpendicular to the transport direction is achieved during the transfer of the guiding and transport forces, so that slipping of the material strip is reliably prevented in addition to providing a reliable guidance.

In another embodiment of the device the latter is arranged on a frame that can essentially be displaced tangential to the installation drum, wherein the receptacle devices are arranged such that they can be pivoted about an axis of rotation that is located in the displaceable frame and toward the rear of the contact point on the installation drum viewed in the transport direction.

The previously described advantageous tangential movement of the receptacle devices is realized with the aid of a frame that contains the receptacle devices. In this case, all of the required elements of the device are displaced collectively and do not have to be adjusted individually by means of an aligned separate control. The pivoting movement of the receptacle device takes place about an axis of rotation that is located in the displaceable frame and toward the rear of the contact point on the installation drum viewed in the transport direction. The lifting of the receptacle devices, which takes place after depositing the material strip on the installation drum and after the retraction of the needles, may, due to the increased pivoting radius, only take place in the form of slight movements of lifting or pivoting elements such that dynamic stresses on the entire device and possible effects on the positioning of the material strip can be prevented.

A sliding and guiding plate is advantageously arranged between the pattern table and the installation drum. This plate supports the material strips during the transport to the deposition to point. Such a sliding and guiding plate reduces the forces to be generated by the needles perpendicular to the transport direction because the majority of the strip weight is supported by the guide plate, wherein the material strips are essentially dragged over the guide plate.

In another embodiment of the device, which is an embodiment with a particularly compact construction, there is a pressing roller for the material strips which can be pivoted in the displaceable frame and pressed against the region located behind the deposition point on the installation drum. In such a device, the pressing roller is already positioned after lifting the receptacle devices, and the pressing roller merely needs to be lowered onto the installation drum. After one complete revolution of the installation drum, the material strip is completely deposited and the device can be retracted in order to receive the next material strip after raising the pressing roller.

Turning now to the accompanying drawings, FIG. 1 shows a side view of a device 1 according to the invention which includes a frame 4 that can be displaced tangentially to the bellows drum 3 in the transport direction 2. The top of said frame is provided with a receptacle device 5.

The receptacle device 5 contains holding elements that are in the form of needles 6 on its front end, with said holding elements penetrating into the narrow apex strip 7, shown here only in cross section. The holding elements transport the apex strip 7 to the deposition point 8 and subsequently deposit the apex strip 7 on the bellows drum 3.

The receptacle device 5 is designed such that it can be displaced parallel to the needle axes in order to result in the penetration of the needles, and for this reason, the receptacle device can be moved forward and backward in this direction with the aid of a cylinder 9.

The receptacle device 5 with its corresponding centering and fastening elements is arranged on a toggle lever 10 that can be pivoted about an axis of rotation 11 located in the frame 4 and that is connected to the frame. The pivoting movement is realized by means of the cylinder 13 that acts upon the upper hinge point 12 of the toggle lever and is coupled to a bearing block 14 that forms part of the frame 4.

The device also contains a pressing roller 16 that is supported so that it can pivot by means of a U-shaped holding bracket 15 that is mounted onto the frame 4 by means of a flange. This pressing roller can be moved toward the bellows drum 3 behind the deposition point 8 by means of a cylinder 17 with the aid of a lever 18 and serves to press the material strip deposited on the bellows drum. The contact position of the pressing roller is illustrated with a broken line.

The device also contains a series of fixing and adjusting devices that are activated essentially by means of clamping elements and levers. Here, these devices are not illustrated in detail.

The description of the function of the device is based on the deposition position shown in FIG. 1. As soon as this position is reached and the material strip 7 is located at the deposition point 8, the needles 6 arranged in two rows are pulled out of the material strip by retracting the cylinder 9. Due to its initial stickiness, the material strip 7 adheres to the circumference of the bellows drum 3. Subsequently, the bellows drum begins to rotate and the pressing roller 16 is moved into its operating position behind the deposition point by extending the cylinder 17. The entire material strip is then wound onto the bellows drum by means of the rotation of the drum by one revolution, and the ends of the material strip are connected so that they are flush or overlap. Subsequently, the pressing roller 16 is moved into the stand-by position by retracting the cylinder 17. The start-up of the cylinder 13 then initiates the retraction movement and initially pivots the receptacle device 5 about the axis of rotation 11 into a retracted position in which it is lifted off the bellows drum 3. As soon as this retracted position is reached, the entire frame 4 is moved tangentially back in the direction opposite the transport direction until it reaches a not-shown pattern table, on which a new material strip on a horizontal surface can be taken hold of In order to take hold of the material strip, first, the cylinder 13 extends and the receptacle device 5 pivots back into the receptacle position via the toggle lever 10. The receptacle position relative to the frame 4 corresponds to the depositing position shown in FIG. 1.

One end of the new material strip 7 to be deposited is now located underneath the needles 6 of the receptacle device 5. In this position, the receptacle device 5 is moved onto the material strip 7 parallel to the needle axes by extending the cylinder 9 until the needles 6 have penetrated into the material strip 7 over almost its entire thickness.

Subsequently, the cylinder 13 that acts upon the toggle lever 10 is retracted again and the receptacle device 5 pivots upwards with the apex strip 7 fixed thereon, then the frame 4 moves forward again in an essentially tangential transport direction relative to the circumference of the bellows drum 3 and the front end of the apex strip 7 is slightly raised and dragged over a sliding and guiding plate that is not shown in detail until the frame 4, and consequently the entire device, have reached the position shown in FIG. 1.

In this position, the cylinder 13 extends and pivots the receptacle device 5 exactly to the depositing position via the toggle lever 10 such that the material strip 7 is deposited or bonded onto the outer circumference of the bellows drum 3.

Subsequently, the already described retraction of the needles 6 as well as the additional steps for depositing the apex strip 7 onto the drum 3 are repeated.

Figure 2:
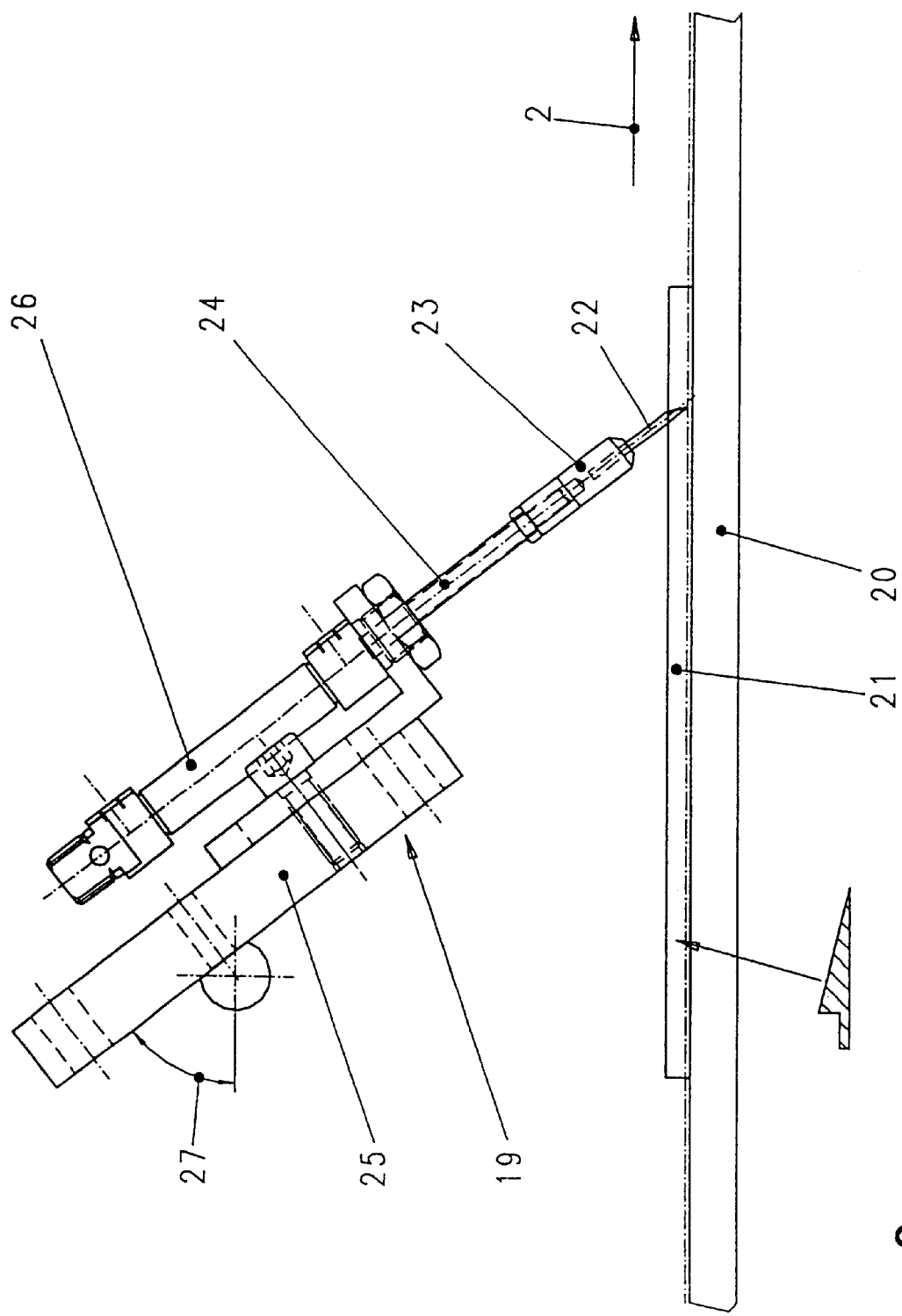
FIG. 2 is a schematic view of a receptacle device of the device according to the invention in the form of a simplified test version with only one row of needles.

FIG. 2 shows a simplified version of the receptacle device with only one row of needles. This receptacle device was used as a test version and once again clarifies the principle of the device according to the invention with respect to the receptacle device.

This figure shows the position of the receptacle device 19 above a pattern table 20, on which an extruded apex strip 21 that was already cut to length is located. In this case, the apex strip 21 has the cross-sectional profile schematically illustrated within the lower region of the figure, where the width of the enlarged apex strip 12.5 mm.

The receptacle device 19 contains the holding elements 22 that are in the form of needles, the tips of which are beveled in the form of a cylinder section (ungula of a cylinder). Three needles are arranged adjacent to one another in the needle holder 23 that is fastened to the piston rod 24 of a cylinder 26 screwed into a holder 25.

The largest cylinder stroke has already been reached in the position shown, and the piston rod has extended to such a degree that the needles 22 penetrate into the material strip/apex strip 21 parallel to the needle axes.

Relative to the transport direction 2, the needles 22 are arranged so that they are inclined toward the rear at an angle 27 of 52.5° by means of fixing the holder 25.

In the position shown, the apex strip 21 is taken hold of and fixed. Subsequently, the apex strip 21 can be displaced tangential to the bellows drum by pivoting the receptacle device and advancing in the transport direction, whereafter the deposition of the apex strip 21 takes place as described above and the receptacle device is retracted.

For reasons of clarity, the remaining devices—e.g., frame, toggle lever, pivoting cylinder, etc.—are not shown in FIG. 2.

Figures 3A, 3B:
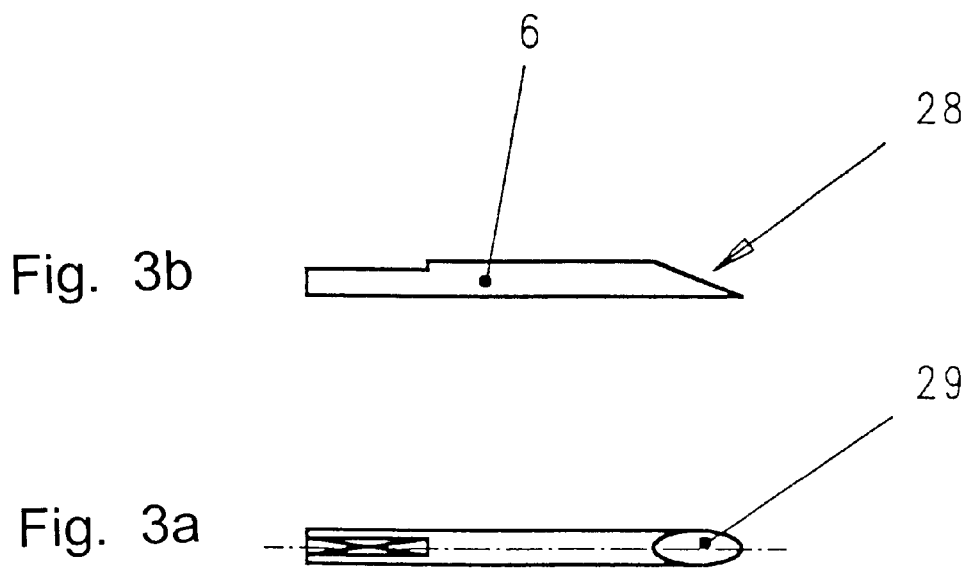
FIGS. 3a and 3b are top and side views respectively of an advantageously designed needle of a holding element.

FIGS. 3a and 3b show a detailed representation of a needle 6. The cylinder section (ungula of a cylinder) 28 that produces the elliptical contact surface 29 which is advantageous for force transfer can be clearly identified in this figure.

Figure 4:
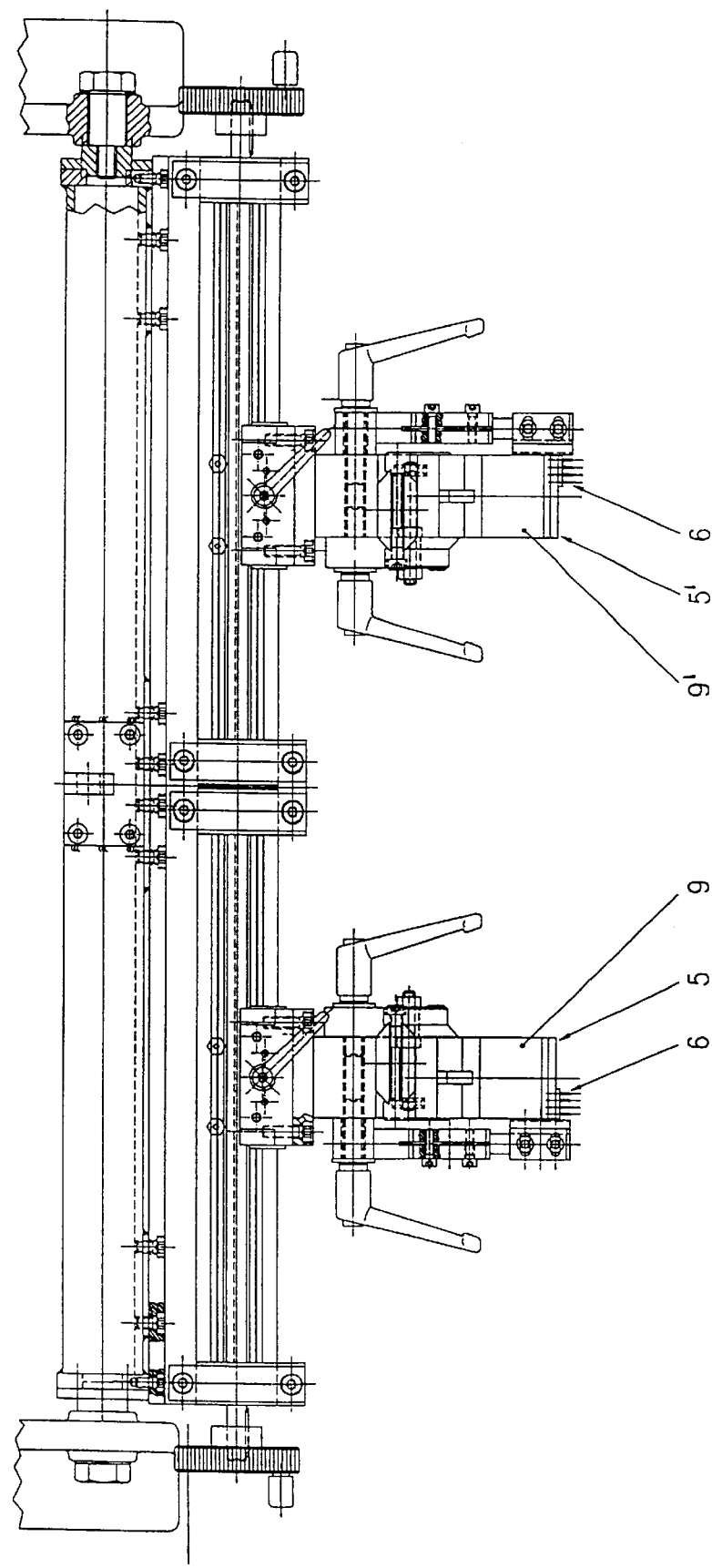
FIG. 4 is a schematic top view of the head part of the device shown in FIG. 1.

FIG. 4 shows the head region of the device shown in FIG. 1 in the form of an enlarged top view. In addition to the clamping and adjusting elements not described in more detail here for adjusting the device according to the invention and the receptacle devices, one can clearly identify the double arrangement of receptacle devices 5 and 5' for the deposition of two apex strips as well as the corresponding four adjacent needles 6 of the first needle row that are arranged such that they can be displaced parallel to the needle axes via cylinders 9 and 9'. In this case, these cylinders are designed in the form of flat cylinders provided with guide elements.

Further variations and modifications of the foregoing will be apparent to those skilled in the art and are intended to be encompassed by the claims appended hereto.

German priority application 198 56 720.0 is relied on and incorporated herein by reference.

We claim:

1. Device for transporting a material strip made of rubber or a synthetic rubber material and for depositing said material strip on an installation drum for a pneumatic tire or a part of said tire, wherein an advancing material strip is cut to length from an endless material and positioned on a pattern table within the region of said device, and said device comprising at least one pivotable receptacle device that can be displaced in a transport direction and that is used to take hold of at least one end of said material strip positioned on a pattern table in order to transport said material strip to a depositing position and deposit said material strip on the installation drum, said receptacle device being displaceable in a transport direction that is essentially tangential to a circumferential surface of said installation drum, and said receptacle device containing at least one holding element that can penetrate into said material strip and produce a temporary and detachable positive connection with said material strip, wherein said holding element which can penetrate into said material strip is in the form of a needle arranged so that it is inclined toward the rear relative to the transport direction of the material strip, and said receptacle device being displaceable parallel to an axis of said needle in order to be able to penetrate said material strip.

2. The device according to claim 1, wherein a plurality of needles which penetrate into said material strip being arranged in the form of at least two rows that lie one behind the other and wherein each contains four adjacent needles, where the needles are uniformly distributed over the width of said material strip.

3. The device according to claim 1, wherein said needle has a tip which can penetrate into said material strip and is in the form of a cylindrical section, where said cylindrical section has surfaces arranged essentially perpendicular to the transport direction and inclined toward the rear relative to the transport direction.

4. The device according to claim 1, wherein a plurality of needles which penetrate into said material strip are arranged so that they are inclined toward the rear relative to the transport direction of the material strip at an angle not greater than 55°.

5. The device according to claim 2, wherein a plurality of needles which penetrate into said material strip are arranged so that they are inclined toward the rear relative to the transport direction of the material strip at an angle not greater than 55°.

6. The device according to claim 3, wherein a plurality of needles which penetrate into said material strip are arranged so that they are inclined toward the rear relative to the transport direction of the material strip at an angle not greater than 55°.

7. The device according to claim 1, further comprising that the device is arranged on a frame that can be displaced essentially tangential to said installation drum, and by said receptacle device being arranged such that they can be pivoted about an axis of rotation that is located in a displaceable frame and lies behind a deposition point on said installation drum viewed in the transport direction.

8. The device according to claim 1, further comprising a sliding and guiding plate that supports said material strip during transport to a deposition point being arranged between said pattern table and said installation drum.

9. A device according to claim 7, further comprising a pressing roller which can be pivoted in said displaceable frame and moved to a region located behind the deposition point on said installation drum.

\* \* \* \* \*